United States Patent Office 2,928,737
Patented Mar. 15, 1960

2,928,737

PELLETING COTTONSEED MEAL

Homer D. Fincher, Houston, Tex., assignor to Anderson, Clayton & Co., Houston, Tex., a corporation of Delaware No Drawing. Application September 4, 1953
Serial No. 378,686

2 Claims. (Cl. 99—2)

The present invention relates to extruded feeds and methods of making such feeds which are suitable for animals, poultry and the like.

Many feedstocks have been pelleted by extrusion or expression into feed pellets and among feedstocks so pelleted are meal from which oil has been removed, such as cottonseed meal, soya bean meal and the like, forage, hay, grasses and many other materials and additives suitable for feeding animals, poultry and the like.

Various oil seed meals have been used in whole or in part as the feedstock for feed pellets. For many years the meal, for example cottonseed meal, has had oil removed from it by hydraulic and screw presses. Such meal is generally called hydraulic and expeller meal and the oil is referred to as hydraulic and expeller or expressed oil. In using hydraulic or screw presses, a relatively large quantity of oil is left in the meal and methods have been developed to extract more oil from the meal. A method presently in use is a solvent-extraction process which recovers more of the oil and leaves less than one per cent by weight of oil in the meal. This is particularly the case in the solvent extraction of cotton seed meal.

In expressing or extruding feeds having a low oil content, such as feeds consisting of or including solvent-extracted oil seed meal, considerable difficulty has been encountered in forcing the material through the dies because of the pressures required, the wear on the apparatus, and the relative low capacity of the pelleter. In addition, feed pellets formed of original source materials having a low oil content, such as materials formed in whole or in part from solvent-extracted oil seed meal, have a dull and mottled appearance.

It is, therefore, an object of the present invention to provide a process for pelleting feeds by which the capacity of usual extrusion or expression pelleters is increased, and power consumption, required pressures, and wear and tear on the extruder are reduced.

It is a further object of the present invention to provide a pelleted feed suitable for animals, poultry and the like which has a glossy, smooth and attractive appearance.

The whole oil as it comes from the extraction step includes impurities and is subjected to a refining process. In a typical refining process presently in use, a reagent of the type capable of combining with the free fatty acids in the oil to form soapstock is used, such as an alkali or caustic, and thereafter the soapstock is separated from the neutral oil, such as by centrifuging. I have found that the addition of a small quantity of a non-toxic metal or alkali salt of the fatty acids formed from the separated soapstock to the feed materials before pelleting reduces power consumption, wear and tear and required pressures, and increases the capacity of an extrusion-type pelleter, as well as providing a glossy, smooth and attractive feed pellet suitable for feeding to animals, poultry and the like.

It is, therefore, a further object of the present invention to provide a process of pelleting feed materials and providing feed pellets in which non-toxic salts of fatty acids recovered in the refining of seed oil are added to the raw feed materials which includes, at least in part, meal from which the seed oil is recovered before pelleting to reduce wear and tear on the pelleter, increase the capacity of the pelleter, reduce the power consumption and pressures of the pelleter, and provide a feed pellet of glossy, shiny and improved appearance. The fatty acids, of course, may be derived from other sources, such as animal or petroleum sources and the like, and, accordingly, it is yet a further object of the present invention to provide a process of pelleting feed materials and providing feed pellets in which non-toxic salts of fatty acid from any suitable source or sources are added to feed materials which provides the advantages mentioned.

It is yet a further object of the present invention to incorporate a calcium salt of fatty acid into the feed materials prior to extrusion.

A further object of the present invention is the incorporation of an inexpensive non-toxic by-product of at least part of the feed materials into the feed materials before extrusion into feed pellets.

Other objects, features and advantages will readily be apparent from the following description of typical examples of the invention. In this specification the invention is disclosed in its preferred form. It is to be understood, however, that it is not limited to this form because it may be practiced in other forms within the purview of the claims following the description.

The following disclosure will relate particularly to the treatment and use as a feedstock of solvent-extracted cotton-seed meal, which teaching will guide those skilled in the art in treating and using other substances, without departing from the spirit of the invention.

Any non-toxic metal or alkali salt of fatty acid is satisfactory, such as calcium, sodium, aluminum, magnesium, iron, and like salts of fatty acid. At present calcium salt of fatty acid is preferred.

These salts of fatty acid may be prepared in numerous ways; however, a very inexpensive source is the raw soap stock produced as a by-product from alkali refining of crude vegetable oils. The raw soap stock varies in composition depending on the type of crude oil being refined and the process employed and contains from about 25% to about 43% total fatty acids in a saponified state and about 4% to about 15% free or neutral oil unsaponified. (The percentages mentioned and given hereafter are by weight.)

A typical satisfactory non-toxic salt of fatty acid, such as calcium salt of fatty acid, was prepared by completely saponifying raw soapstock from cotton seed oil to sodium salt of fatty acid. The saponification of the raw soapstock was done by adding the required amount of sodium hydroxide to convert the neutral oil to sodium soap. As a refinement, the sodium salt of fatty acid was washed with salt water for the removal of color pigments, protein matter and other nonfatty material to give a more desirable color to the finished calcium salt of fatty acid. The salt water washing of the sodium salt was accomplished by adding salt (in either dry or slurry form) and the resultant mixture boiled for three to four hours. After boiling, the mixture was allowed to settle for approximately four hours at which time the spent liquors containing color pigments, protein matter and other non-fatty material were drawn off the bottom. It will be understood, however, that either or both the saponification and the salt water washing steps may be omitted if desired.

The sodium salt of fatty acid was then converted to calcium salt of fatty acid by substituting the calcium ion for the sodium ion in the following manner: the sodium salt was diluted in water to a mixture of 20% solids and 80% water in a kettle equipped with open steam and mechanical agitator. The slurry was heated to a temperature of 160° F., at which time the required amount of calcium chloride was added. Agitation and heat were continued with open steam to 190° F., at which point agitation was stopped and the temperature brought up to the boiling point. On reaching the boiling point, the salt was fused together in a solid mass and floated to the top of the kettle, leaving clear amber-colored liquor underneath. At this point, heating was discontinued and the mass quick-cooled by spraying with cold water. Agitation was again started at the same time as quick-cooling and was continued until the salt mass was broken into small lumps or granules. The temperature of the salt mass was held at approximately 180° F., at which temperature the calcium salt was extremely brittle. The mixture was then decanted onto a rotating screen, the heat of the salt particles driving off moisture from the surfaces to finish with a final moisture content of approximately 25%. Preferably, the calcium salt of fatty acid was ground to a powdered salt and conventional type of grinding and drying equipment was used to produce a powdered calcium salt of fatty acid which would pass through a 200-mesh screen.

The above example is a typical method of producing calcium salt of fatty acid. Any suitable method may be used, however, to produce any non-toxic metal or alkali salt of fatty acid, and the fatty acids may be derived from any suitable source. For example, satisfactory sources from which the fatty acids may be derived in addition to cotton seed oil are the other vegetable oils, such as soya bean oil, peanut oil, palm oil, palm kernel oil, sesame oil and the like, and from animal fats, petroleum oils and the like.

Any suitable materials for feeding to animals, poultry and the like used for pelleting may be used, such as the meal from any form of oil seed cake, and, particularly cottonseed meal and other vegetable oil meals, such as soya bean meal, peanut meal, and the like, from which whole oil has been removed and particularly by solvent-extraction processes. Other suitable materials are hulls, alfalfa meal, ground milo, grasses and the like and various additives may be incorporated, such as cane molasses, phosphate, salt and the like. In short, any of the usual and suitable materials for feeding animals, poultry and the like, may be used.

The process may be carried out in the following manner. The feedstock may comprise in part or in whole cottonseed meal from which cottonseed oil has been removed, such as by a solvent-extraction process. The meal is ground to a suitable size and placed in a suitable vessel. The whole oil may be refined by adding caustic or alkali, the fatty acids combining with the alkali to form soapstock which includes various impurities, together with entrained neutral oil. The soapstock is separated from the whole oil and the raw soapstock is completely converted first to sodium salt of fatty acid by saponification of the entrained neutral oil, and then to calcium salt of fatty acid. The calcium salt of fatty acid may be ground to a fine powder and a small quantity added to the feed material or materials before pelleting. The feed material or materials may then be pelleted by means of an extrusion-pelleting apparatus, which forms a glossy and attractive feed pellet.

While it is highly advantageous to derive the non-toxic salt of fatty acid as or from a by-product in the refining of oils derived from the original raw material, such as cottonseed, in whole or in part, it will be understood that non-toxic salt of fatty acid derived from any source or formed in any suitable manner may be used and that it is not necessary to derive the non-toxic salt from the original raw materials or mixtures thereof utilized.

The following are typical examples of the invention.

EXAMPLE I

A cottonseed meal from which oil has been removed by a solvent process was used as a feed material, and this raw meal contained 9.3% moisture, 2.89% oil and 41.60% protein. In this case, one-half inch feed pellets were made and the addition or incorporation of 1% of calcium salt of fatty acid to the meal prior to pelleting gave a capacity increase of 108% and produced a pellet having a smooth and glossy finish.

The calcium salt of fatty acid used in this example was screened through 1/8" perforated metal. In extruding the pellets through an orifice, the dies were heated from about 170° F. to 220° F. due to friction. The calcium salt added had the following composition.

| Analysis: | Percent |
|---|---|
| Total fatty acids | 84.82 |
| Oxidized acids | 5.29 |
| Insoluble impurities | 1.07 |
| Moisture | 3.22 |
| Calcium | 6.27 |
| Ash-acid insoluble | 0.19 |
| Phosphorus | 0.14 |
| Total | 101.00 |

| Calculated: | |
|---|---|
| Calcium soap | 90.54 |
| Oxidized acids | 5.29 |
| Insoluble impurities | 1.07 |
| Moisture | 3.22 |
| Excess calcium | 0.25 |
| Ash-acid insoluble | 0.19 |
| Phosphorus | 0.14 |
| Total | 100.70 |

EXAMPLE II

In this example, the raw feed material was cottonseed meal which contained 7.0% moisture, 0.94% oil and 38.30% protein. The meal was pelleted into three-fourths inch pellets and 2% by weight of calcium salt of cottonseed fatty acid was incorporated in the meal which increased the capacity of the extrusion apparatus by over 300% and reduced power consumption to 22½% of the requirement without the additive. The finished pellets were smooth and glossy.

Similar results were obtained by incorporating 0.5% and 1.0% of calcium salt of fatty acid in feed material or materials. Pellets made from this feedstock without calcium salt of fatty acid were rough, mottled and dull in appearance.

In this example the calcium salt was ground to a very fine powder in a hammer mill with 1/8" screen and had the following composition:

| Analysis: | Percent |
|---|---|
| Total fatty acids | 81.78 |
| Oxidized fatty acids | 7.21 |
| Insoluble impurities | 1.02 |
| Moisture | 3.32 |
| Calcium | 5.90 |
| Total | 99.23 |

Calculated:

| | Percent |
|---|---|
| Calcium soap | 87.28 |
| Oxidized fatty acids | 7.21 |
| Insoluble impurities | 1.02 |
| Moisture | 3.32 |
| Excess calcium | 0.11 |
| Total | 98.94 |

EXAMPLE III

In this example a mixed feedstock was used which comprised 58.50% hulls, 10% cottonseed meal, 20% ground milo, 5% alfalfa meal, 5% cane molasses, 1% phosphate, and 0.5% salt. To this mixed feedstock 1.5% by weight of ground calcium salt of fatty acid of Example II was added prior to extrusion. Despite the bulky nature of this material, the capacity of the extruder was increased by 20% and the power consumption was reduced by 25%.

EXAMPLE IV

In this example a cottonseed meal from which oil had been removed by a solvent process was used as the feed material. This raw meal contained 8.5% moisture, 0.94% oil and 40.20% protein. One-half inch feed pellets were made and to this raw meal was added sodium soap of cottonseed fatty acid. The sodium soap had a moisture content of 58.51% and a total fatty acid content (calculated as the oleic acid) of 35.94%. The oleic acid salt would have a molecular weight and formula of 304.4 and $CH_3(CH_2)_7CH=CH(CH_2)_7COONa$, respectively. The 35.94% total fatty acids yielded 38.8% sodium soap. The addition of 1.85% (dry basis) of this additive increased the capacity of a California Century Pelleting Machine three times and reduced the power consumption to about one-third of that required without the additive.

EXAMPLE V

The cottonseed meal of Example IV was used as the raw meal and one-half inch pellets were made. To this raw meal was added iron (ferric) soap of cottonseed fatty acid which had a 59.73% moisture content and a total fatty acids content (calculated as oleic acid) of 34.43%. The oleic acid salt would have a molecular weight and a formula of 900.2 and

$[CH_3(CH_2)_7CH=CH(CH_2)_7COO]_3Fe$ respectively. The 34.43% total fatty acids yielded 36.5% ferric soap. By adding 0.79% (dry basis) of this ferric soap to the raw meal, the capacity of the California Century Peletting Machine was increased about two and a half times while reducing the power consumption to about 37% of that required without the additive.

EXAMPLE VI

As further examples of non-toxic salts of fatty acids which are satisfactory are calcium salt of fatty acids derived from soybean oil, soybean oil soapstock and magnesium salt of fatty acids derived from peanut oil soapstock. The calcium salt may be made from saponified soybean oil soapstock in the same manner as indicated in connection with making calcium salt of cottonseed fatty acid, although it may be made in other ways. The magnesium salt of fatty acid may be made by adding magnesium sulfate solution to acidulated peanut oil soapstock. The magnesium salt of peanut fatty acid may also be precipitated under the same conditions as those mentioned in precipitating the calcium salt of cottonseed fatty acid. Of course, the peanut oil soapstock need not be acidulated to prepare the magnesium salt of fatty acid derived therefrom, and it may be prepared in other ways.

As specific examples of such salts of fatty acids, the following typical analyses are given:

*Calcium soap from SBO soapstock*

| Analysis: | Percent |
|---|---|
| Calcium soap | 89.56 |
| Excess calcium | 0.28 |
| Moisture | 0.29 |
| Oxidized fatty acids | 1.27 |
| Insoluble impurities | 0.74 |
| Sodium chloride | 7.86 |
| Total | 100.00 |

*Magnesium soap from acidulated PNO soapstock*

| Analysis: | Percent |
|---|---|
| Magnesium soap | 83.70 |
| Excess magnesium | 0.00 |
| Moisture | 1.36 |
| Oxidized fatty acids | 2.92 |
| Insoluble impurities | 0.59 |
| Sodium sulfate | 10.07 |
| Unknown | 1.36 |
| Total | 100.00 |

The above analyses of the soaps were made after oven drying. The moisture contents of the calcium and magnesium soaps before drying were 32.96% and 36.70%, respectively. The excess calcium is indicated as calcium hydroxide. These specific salts of fatty acids are typical and illustrative of non-toxic salts of fatty acids which are satisfactory.

Thus, it is seen that the amount of metal or alkali salt of fatty acid will vary with the type of raw feedstock, the quantity of oil therein, the process involved and other factors. A preferred range for solvent-extracted cottonseed meal, however, is from about 0.25% to about 2% by weight of calcium salt of fatty acid, and preferably the total amount of oil plus the non-toxic salt may be of the order of 4%.

Also, the present invention is applicable to both batch and continuous processes and the non-toxic metal or alkali salt may be formed from fatty acids from any source.

The present invention is, therefore, well suited to carry out the object set forth and others inherent therein. The invention is not limited to the pelleting of meal derived from solvent-extracted seed meal nor to any particular material, but comprehends the use of non-toxic metal or non-toxic alkali metal salts of fatty acids for facilitating pelleting processes in producing feed pellets suitable for animals, poultry and the like.

What is claimed is:

1. In a process of producing feed pellets from cottonseed meal from which oil is solvent extracted until the meal is of low oil content, and in which soap stock is separated from the oil and powdered calcium soap is made from the soap stock, the improvement comprising adding a small quantity of the powdered calcium soap to the meal before extrusion, and thereafter extruding the meal through an orifice under pressure.

2. The process of claim 1 where the small quantity comprises from about 0.25% to about 2.0%.

References Cited in the file of this patent

UNITED STATES PATENTS

| 2,168,532 | McMath et al. | Aug. 8, 1939 |
| 2,504,159 | Singer et al. | Apr. 18, 1950 |
| 2,717,209 | Ely et al. | Sept. 6, 1955 |
| 2,746,864 | Pack et al. | May 22, 1956 |

OTHER REFERENCES

Markley: Soybeans and Soybean Products, vol. II (1951), Interscience Publishers, New York, N.Y., page 834.